US012723539B2

(12) United States Patent
Serio et al.

(10) Patent No.: US 12,723,539 B2
(45) Date of Patent: Sep. 1, 2026

(54) SYSTEM AND MACHINE TO IMPROVE FUEL TANK CONDITIONS AND METHOD OF USE THEREOF

(71) Applicant: J. D. North America Corp., Waukesha, WI (US)

(72) Inventors: Craig Serio, New Berlin, WI (US); Dennis Steinhardt, Kiel, WI (US); Robert Pjevach, Suwanee, GA (US); James Dimsey, Crivitz, WI (US); Ken Stair, North Prairie, WI (US)

(73) Assignee: J.D. North America Corp., Waukesha, WI (US)

( * ) Notice: Subject to any disclaimer, the term of this patent is extended or adjusted under 35 U.S.C. 154(b) by 0 days.

(21) Appl. No.: 18/784,448

(22) Filed: Jul. 25, 2024

(65) Prior Publication Data

US 2025/0035033 A1 Jan. 30, 2025

Related U.S. Application Data

(60) Provisional application No. 63/529,212, filed on Jul. 27, 2023.

(51) Int. Cl.
*F02B 47/04* (2006.01)

(52) U.S. Cl.
CPC .................................... *F02B 47/04* (2013.01)

(58) Field of Classification Search
CPC ....................................................... F02B 47/04
USPC .......................................................... 123/1 A
See application file for complete search history.

(56) References Cited

U.S. PATENT DOCUMENTS

| | | | |
|---|---|---|---|
| 4,216,751 | A | 8/1980 | Davison et al. |
| 4,279,231 | A | 7/1981 | Lindberg et al. |
| 6,942,124 | B2 | 9/2005 | Dehn et al. |
| 6,981,532 | B2 | 1/2006 | Dehn et al. |
| 7,270,088 | B2 | 9/2007 | Whitehall |
| 7,743,737 | B2 | 6/2010 | Valentine et al. |
| 8,290,684 | B2 | 10/2012 | Yuen et al. |
| 8,321,158 | B2 | 11/2012 | Proefke et al. |
| 10,858,236 | B2 | 12/2020 | Harvey |
| 11,788,025 | B2 | 10/2023 | Hughes et al. |
| 2007/0209607 | A1 | 9/2007 | Williams et al. |
| 2012/0042848 | A1 | 2/2012 | Hellman et al. |

FOREIGN PATENT DOCUMENTS

| | | | | |
|---|---|---|---|---|
| CN | 211648286 U | * | 10/2020 | .............. F01N 11/00 |
| FR | 2897363 A1 | * | 8/2007 | .............. C10L 10/06 |
| FR | 2936982 A1 | * | 4/2010 | ......... F02M 37/0076 |
| WO | WO-2008078038 A2 | * | 7/2008 | ........... F02M 61/182 |

* cited by examiner

*Primary Examiner* — Hai H Huynh
(74) *Attorney, Agent, or Firm* — Boyle Fredrickson, S.C.

(57) ABSTRACT

A system, method, and formulation or solution used to improve the contents of an engine is provided. More specifically, an integrated or separated system associated with an engine, such as a small engine associated with machinery or a vehicle, helps stabilize the gasoline and onboard fuel system. This can include the fuel tank itself, the carburetor, carburetor components, fuel injection components, and any other components. This prevents damage that can occur to any of these components based on lack of use, for instance during long term storage.

20 Claims, 5 Drawing Sheets

SYSTEM AND MACHINE TO IMPROVE FUEL TANK CONDITIONS AND METHOD OF USE THEREOF

CROSS-REFERENCE(S) TO RELATED APPLICATION(S)

This application claims the benefit of priority on U.S. Provisional Patent Application Ser. No. 63/529,212, filed on Jul. 27, 2023 and entitled System and Formulation to Improve Fuel Tank Conditions, the entirety of which is hereby incorporated by reference.

BACKGROUND OF THE INVENTION

1. Field of the Invention

The present invention relates in general to the field of fuel tanks associated with a variety of engines. More specifically, the present invention is directed to gasoline powered generators or other equipment. Even more specifically, the present invention is directed to a system and formulation that improves the conditions of the interior of engines, particularly when gasoline remains within the engine for extended periods of time, typically when the device is in storage and not subject to active use.

2. Discussion of the Related Art

Gasoline powered engines are used to power a wide variety of machines and vehicles. Oftentimes, the machines or vehicles are operated on a routine basis, resulting in the depletion of gasoline slowly over time. However, in certain instances, engines are not operated for extended periods of time. By way of example, lawnmowers, weedwhackers, blowers, and the like oftentimes go unused during winter months, whereas snowblowers or throwers and the like go unused during spring, summer, and fall months. Other times, equipment is placed in storage for extended periods of time for any number of different reasons.

In many instances, owners of these sorts of equipment anticipate this lack of use, and proactively drain the gasoline, or run the machinery until the gasoline has been depleted, so as to avoid having gasoline sit within the engine for extended periods of time. However, whether intentional or not, many individuals fail to drain and deplete gasoline from devices during extended periods of time. When this occurs, the quality of gasoline, as well as the condition of the interior of the engine, can deteriorate. For instance, the fuel can oxidize and go stale, which can cause varnish to build up in the carburetor. This can make it difficult to start the engine at a later date. It can also cause long term issues for the engine and associated machinery. When this occurs, users will likely be unsatisfied with the machine, and may try to return the machinery, causing losses for the store and manufacturer.

What is therefore needed is a system that improves the interior of an engine holding gasoline for extended periods of time. What is further needed is a system that extends the storage life and quality of the gasoline being held within the engine. What is further needed is a formulation or solution that can automatically or manually be inserted or added into the engine in order to improve the interior of the engine and/or the quality and storage life of gasoline contained therein.

SUMMARY AND OBJECTS OF THE INVENTION

By way of summary, the present invention is directed to a system for preserving an interior of a fuel tank or associated machinery that includes a fuel additive inserted into a portion of the fuel tank or associated machinery. The system includes a variety of embodiments for adding fuel additive to a fuel tank including manual and automatic means for inserting the fuel additive.

One embodiment of the present invention includes a fuel additive system, which includes a reservoir for storing a fuel additive. A fuel tank connected to an engine is in fluid communication with the reservoir. The system also includes an injector system, which is configured to transfer the fuel additive from the reservoir to the fuel tank. A control system is then configured to initiate a transfer of a volume of the fuel additive by the injector system. The transfer is initiated upon startup of the engine.

The volume of fuel additive transferred to the fuel tank may be selected by the control system based at least in part on the size of the fuel tank and the composition of the fuel additive. Further, the control system may be configured to forego a second transfer of fuel additive if the time elapsed from the initial transfer of fuel additive is less than a predetermined setpoint.

In another embodiment, the reservoir is located on a machine. The machine may be a generator or any other piece of equipment having an engine. Further, the fuel additive may be fuel stabilizer.

Another embodiment of the present invention includes a method of injecting fuel additive into a fuel tank. The method includes storing fuel additive in a fuel tank, which is connected to an engine. Upon starting the engine, a volume fuel additive is transferred from the reservoir to the fuel tank.

According to another aspect of the present invention, the system includes a liquid or semi-liquid fuel stabilizer. For instance, the system may include a fuel stabilization injection with a reservoir of fuel stabilizer solution. The injector may be an automatic fuel stabilization injector, or it may be a manual fuel stabilization injector, such as a squeeze bottle.

According to another aspect of the invention, a method for preserving an interior of a fuel tank or associated machinery is provided that includes the steps of providing a fuel stabilizer, inserting the fuel stabilizer into a portion of the fuel tank or associated machinery, and treating the fuel and/or interior of the fuel tank or associated machinery for extended use. The method may further include the step of inserting approximately one ounce or approximately one half of an ounce of fuel stabilizer to treat approximately ten gallons of fuel. The method may also include the steps of providing a container having one or compartments, providing one or more fuel stabilizer tablets in the one or more compartments, and moving one or the fuel stabilizer tablets from the container into the fuel tank or associated machinery. Additionally, the method may also include the steps of moving a lid associated with one or more compartments about a hinge and removably mounting the container to the fuel tank or associated machinery. Further still, the method may include the steps of storing a liquid or semi-liquid fuel stabilizer solution in a reservoir and then injecting the fuel stabilizer solution into the fuel tank or associated machinery using an automatic or manual fuel stabilization injector.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRA WINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1A:
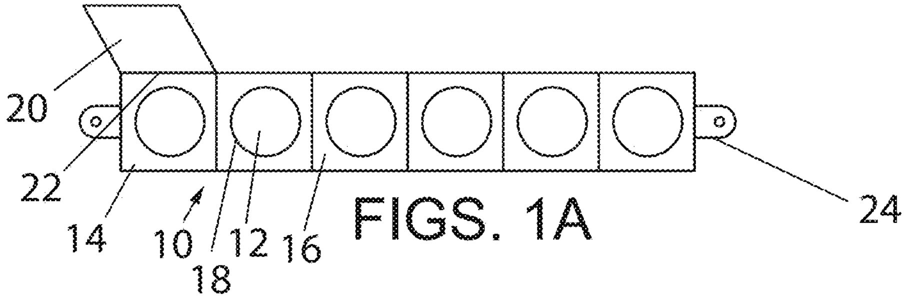
FIGS. 1A and 1B illustrates a top view and a side view of a container having multiple compartments containing a fuel additive that is insertable into an engine.

In describing the preferred embodiment of the invention which is illustrated in the drawings, specific terminology will be resorted to for the sake of clarity. However, it is not intended that the invention be limited to the specific terms so selected, and it is to be understood that each specific term includes all technical equivalents which operate in a similar manner to accomplish a similar purpose. For example, the words connected, attached, or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

An easy to use automatic or manual system that enables a user to easily preserve the quality of the contents of an engine is desired. This in turn helps to prevent damage to any associated components, including for instance, the fuel tank, the carburetor, carburetor components, and fuel injection components, particularly during long-term storage of the device. A simple system and process that allows the user to stabilize the fuel and prevent varnish and other restrictions is desired to increase customer satisfaction.

2. Detailed Description of Preferred Embodiments

The present invention is directed to a system 10 that can be used with an engine (not shown) and any other components associated the engine, including a fuel tank, a carburetor, and the like. The system 10 may take a number of different forms, with each begin designed to optimize use of the engine and associated machine.

Fuel Additive

The system includes inserting fuel additive into a fuel tank or like machinery. The fuel additive may enhance the fuel within the fuel tank or help maintain the interior of the fuel tank. Fuel additive may have the form of a solid, a liquid, or a semi-liquid. In solid form, fuel additive may be a tablet.

In one embodiment, the fuel additive is a fuel stabilizer. Fuel stabilizer may be added to fuel to prevent fuel from going stale, particularly when fuel sits in a fuel tank and/or machine for a long period of unuse. For example, fuel stabilizer may prevent gasoline from oxidizing, thus preventing the buildup of varnish in the fuel tank and carburetor. Fuel stabilizer may come in solid, liquid, or semi-liquid form.

Fuel stabilizer ingredients may include Methanol (MeOH), Ethanol (EtOH), Isopropyl alcohol (IPA), n-butanol (BuOH), Gasoline grade t-butanol (GTBA), hydrotreated light naphthenic distillate solvent extract (also known as mineral oil or petroleum distillates). Viable commercial embodiments of fuel stabilizer include, but are not limited to, STA-BIL® fuel stabilizer products. More specifically, viable commercial embodiments include STA-BIL® Fuel Stabilizer—Storage, WERC'S STA-BIL® Fuel Stabilizer—Storage, and STA-BIL® Ethanol Fuel Treatment & Stabilizer—Protection.

The various formulations of fuel stabilizer may also come in a variety of different concentrations depending on the desired use. For instance, in one embodiment, the formulation has a concentration such that approximately one quarter of an ounce of solution to three ounces of solution of fuel stabilizer (whether it be liquid, solid, gas, or a combination) will treat approximately ten gallons of fuel. In another embodiment, the formulation has a concentration such that approximately one ounce of solution (whether it be liquid, solid, gas, or a combination) will treat approximately ten gallons of fuel. In yet another embodiment, the solution has a concentration such that one half ounce of solution (whether it be liquid, solid, gas, or a combination) will treat approximately ten gallons of fuel.

On-Board Fuel System with Reservoir

The fuel additive system is included on a machine having a fuel powered engine and a fuel tank. The machine may have a medium or large sized engine, or the machine may be considered a small-engine piece of equipment. Examples of small engine machines include, but are not limited to generators, lawn mowers, snow blowers, and pressure washers. The engine displacement range of a small-engine machine may be from 50 cc to 1,000 cc.

Figure 7:
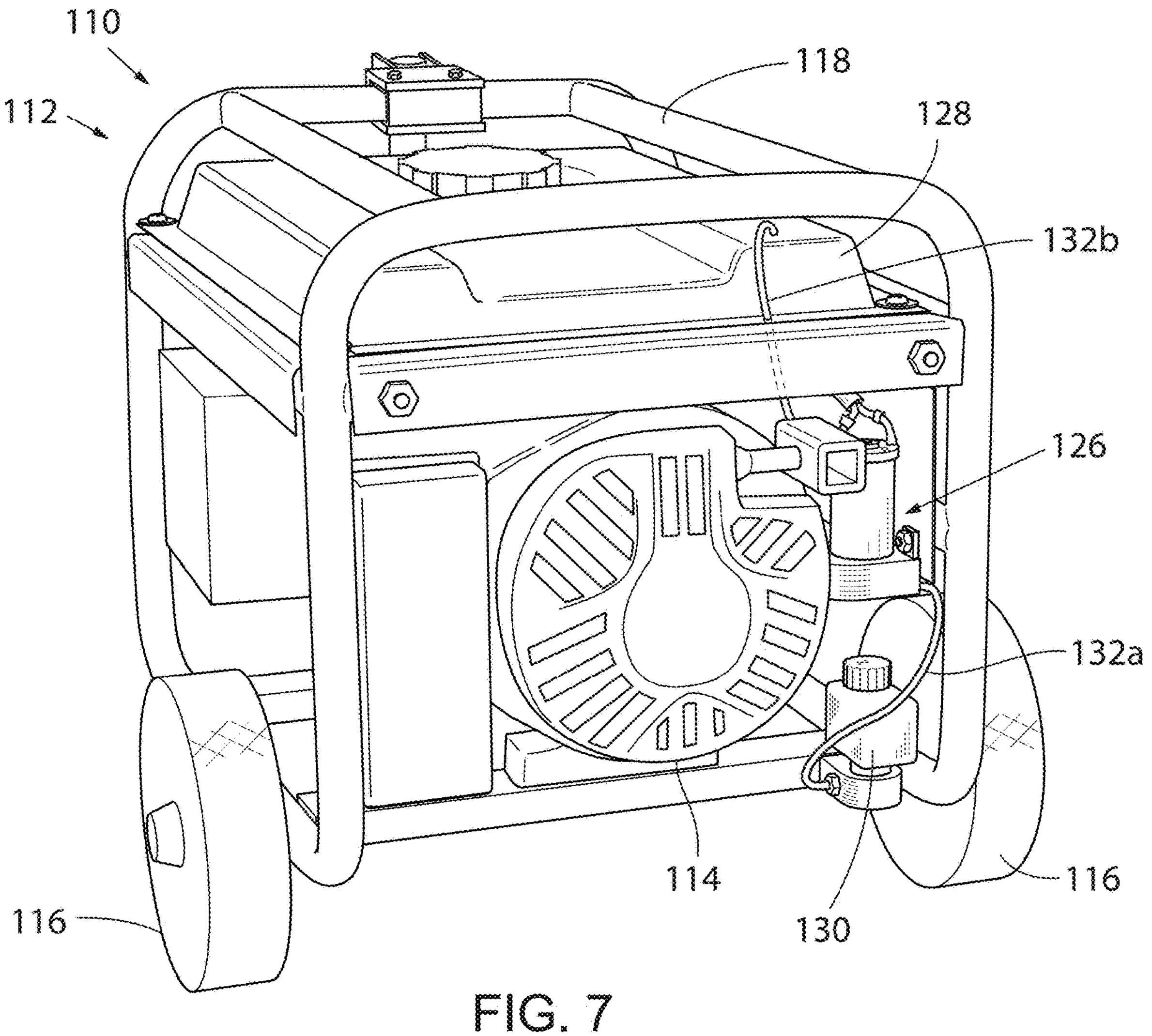
FIG. 7 illustrates a perspective view of a fuel additive system onboard a machine.

In one embodiment, the machine is a generator, as shown in FIG. 7. The generator may be permanent or portable. A portable generator may include a rigid frame and at least one set of wheels.

Figure 8:
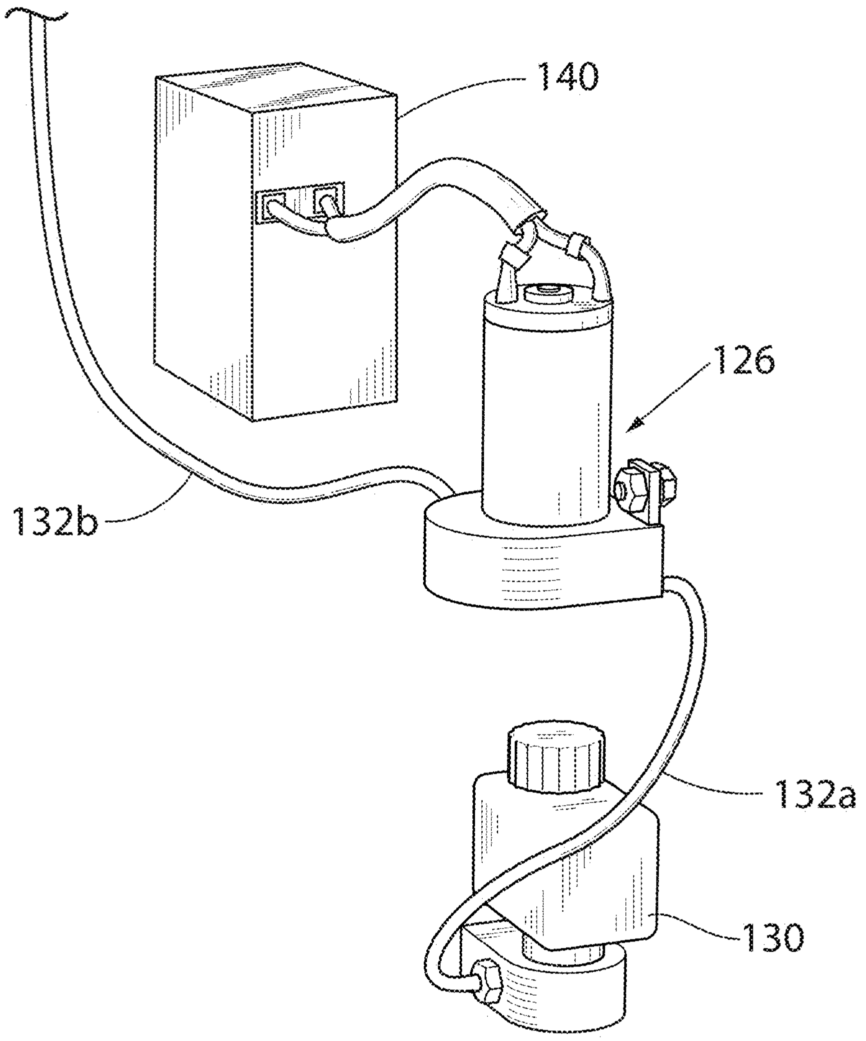
FIG. 8 illustrates a partial perspective view of the fuel additive system shown in FIG. 7.

The present invention also includes a reservoir. The reservoir may be located on the machine. The reservoir is configured to store fuel additive. Further, as shown in FIG. 8, the reservoir is a container that stores a liquid or semi-liquid fuel additive.

The reservoir includes an inlet and an outlet. As shown in FIG. 8, the inlet may be near the top of reservoir and the outlet may be near the bottom of reservoir. A removeable cap may cover and seal the reservoir while the machine is in use. When the machine is off, a user may remove the cap to add fuel stabilizer to reservoir. The reservoir is composed of a rigid material, such as metal or a hard plastic. Further, the reservoir may be composed of a transparent material so the level of stabilizer within the reservoir may be easily viewed by a user.

The reservoir is in fluid communication with a fuel tank. The fuel tank is connected to the engine. The fuel tank stores the fuel on which the engine operates. The fuel tank has a size. Typically, the fuel tank is sized based on the size of the engine to which it is connected. The size of the fuel tank may be described in terms of the amount of fuel capable of being stored within the fuel tank. For example, a fuel tank may be sized to hold from 0.5 to 9 gallons of fuel, or 1.0 to 7.5 gallons, or 2.5 to 5 gallons.

In one embodiment, the amount or volume of fuel additive selected is based at least in part on the size of the fuel tank and/or the composition of the fuel additive. It is known in the industry that the fuel-to-fuel additive ratio must be precise. Too much or little fuel additive relative to fuel can cause the engine to operate inefficiently or even cause damage to the engine. The volume of fuel additive inserted into the fuel tank varies on the size of the fuel tank (e.g., how much fuel is stored in the fuel tank) and the composition of the fuel additive (e.g., what is the concentration of fuel stabilizer). In an embodiment, the fuel-to-fuel additive ratio is 2.5 gallons to 1 ounce.

The system further includes an injector system. The injector system is configured to transfer fuel additive from the reservoir to the fuel tank. In one embodiment, the injector system is in fluid communication with the reservoir and the fuel tank and is located between the reservoir and the fuel tank. The injector system may incorporate a positive means of displacing fuel additive from the reservoir to the fuel tank. In one embodiment, the injector system is a pump, which pumps fuel additive from the reservoir to the fuel tank. In another embodiment, the injector system may displace the fuel additive via gravity. For example, the reservoir may be physically located above the fuel tank, and a flow of fuel additive is controlled via a valve between the reservoir and the fuel tank. In yet another embodiment, the injector system may incorporate a pump and a valve.

One embodiment of the system includes conduit. Conduit connects the reservoir to the injector system and/or the injector system to the fuel tank such that the reservoir, the injector system, and the fuel tank are in fluid communication. The conduit may be tubing, flexible hosing, or the like.

In one embodiment of the present invention, the system manually inserts fuel additive into the fuel tank. The manual system may incorporate a manual trigger, such as a push button, that causes the injector system to transfer fuel additive from the reservoir to the fuel tank. In one embodiment, the manual system incorporates a primer bulb, which is known in the art. The manual trigger may be triggered by the user upon startup of the engine.

In another embodiment of the present invention, the system automatically inserts fuel additive into the fuel tank. The automatic system includes a control system, which is configured to control the injector system. The control system may be electrically connected to the injector system by traditional means. The control system is configured to initiate a transfer of fuel additive. The transfer includes the injector system transferring a volume of fuel additive from the reservoir to the fuel tank upon startup of the engine. In other words, when the engine is turned on, the control system automatically initiates a transfer of some fuel additive by the injector system.

By injecting the fuel additive at startup, the system receives the additional benefit of distributing fuel additive throughout the entire fuel system. The fuel additive injected into the fuel tank is then put through the carburetor and remaining fuel system as the engine runs. Thus, the entire fuel system is protected from fuel oxidation and varnish. In contrast, fuel additive inserted into a fuel tank while the engine is off or upon shutdown of the engine may sit in the fuel tank for an extended period of time. The fuel additive is not run through the entire fuel system, thus, only the fuel tank receives the benefit of the fuel additive.

Similarly, transferring fuel additive to the fuel tank allows for all fuel system components downstream of the fuel tank to receive the benefit of the fuel additive. For example, fuel additive is transferred downstream to the carburetor protecting both the fuel tank and the carburetor.

The control system may also be configured to select the volume and/or amount of fuel additive transferred to the fuel tank. In one embodiment, the control system selects the volume of fuel additive transferred to the fuel tank based at least in part on the size of the fuel tank. In another embodiment, the control system selects the volume of fuel additive transferred to the fuel tank based at least in part on the composition of the fuel. In yet another embodiment, the control system selects the volume of fuel additive transferred to the fuel tank based at least in part on both the fuel tank size and the composition of the fuel.

The control system may also include a timer. The timer measures time that has elapsed since fuel additive has been transferred to the fuel tank. The timer may measure the time elapsed since only the last transfer or may measure time elapsed for multiple transfers. In one embodiment, time elapsed since the last transfer is based on the time elapsed since the last startup of the engine. In another embodiment, the time elapsed is measured based on the time elapsed since the injector system was last initiated.

The control system may be configured to forego initiation of a second transfer of fuel additive if the time elapsed since the last transfer is not greater than a predetermined setpoint. It is desired to avoid adding an excessive amount of fuel additive to the fuel tank. In one embodiment, the control system foregoes injecting additional fuel additive to the fuel tank if too short a period has passed since the last transfer. For example, a first transfer of fuel additive may occur upon startup of the engine. Should the engine turn off or stall and need to be immediately restarted, the timer would measure a small time elapsed. The time elapsed would be less than a predetermined setpoint, so the control system would forego initiating a second transfer of fuel additive upon the engine restart.

In another embodiment, the timer measures the run time of the injector system. Based on the timer, the control system shuts off the injector system after a predetermined run time. In one embodiment, the control system is configured to correlate the run time measured by the timer to units of fuel additive transferred from the reservoir to the fuel tank by the injector system. After a predetermined quantity of units are transferred, based on the capacity of the fuel tank, the control system may turn the injector system off.

For example, in one embodiment, the injector system is a pump. The control system turns on the pump upon startup of the engine. The pump transfers a known amount of fuel additive from the reservoir to the fuel tank every second, which is directly related to the pump's flow rate. Based on the pump's flow rate, the control system is configured to allow the pump to run for a set amount of time, which equates to the required units of fuel additive needed for a specific fuel tank capacity.

The control system may measure and modulate a variety of parameters. For example, the control system may modulate (a) the time elapsed since a transfer of fuel additive to a fuel tank, (b) the time elapsed since the startup of the engine, and/or the volume of fuel additive transferred to the fuel tank.

The present invention also includes a method of injecting fuel additive into a fuel tank. The method includes providing a reservoir in fluid communication with a fuel tank, which is connected to an engine. The reservoir stores fuel additive. Upon starting the engine, fuel additive is transferred from the reservoir to the fuel tank. The fuel additive may be transferred via an injector system, which may include a pump. The method may also include measuring the time elapsed since transferring the fuel additive. If the time elapsed is greater than predetermined setpoint, a second transfer may be initiated. If the time elapsed is less than a predetermined setpoint, a second transfer may be foregone.

One embodiment of the present system is shown in FIGS. 7-8. The system 110 includes an engine 114, a fuel tank 128, a reservoir 130, an injector system 126 and a control system 140 located onboard a machine 112, which is represented as a portable generator having wheels 116 and a frame 118. The reservoir 130 is in fluid communication with the fuel tank 128 via two conduit lines 132*a*, 132*b* with the injector system 126 located in-between.

As shown in FIG. 8, a conduit line 132*a* connects the reservoir 130 to the injector system 126. The injector system 126 is a pump. A second conduit 132*b* line then connects the injector system 126 to the fuel tank 128. The control system 140 is electrically connected to the pump and is configured to initiate the pump. When the control system 140 initiates the pump, the pump displaces fuel additive from the reservoir 130 through the pump and to the fuel tank 128. The control system 140 may be configured to modulate the pump to select a specific volume of fuel additive to be transferred from the reservoir 130 to the fuel tank 128.

Figure 2:
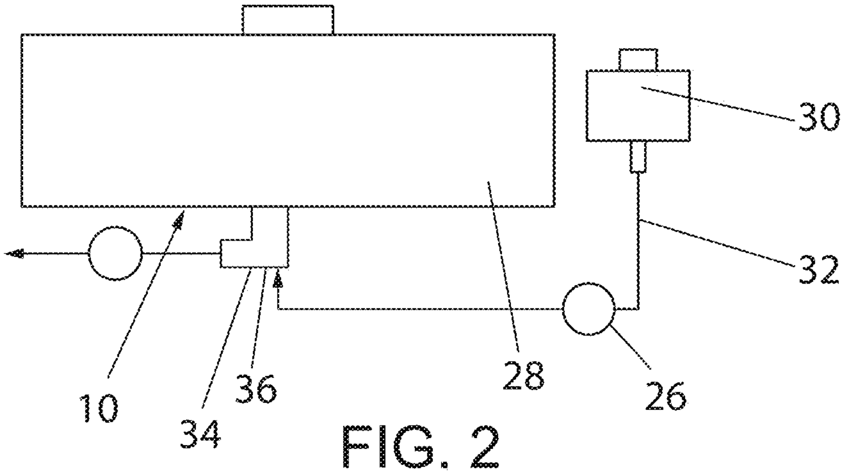
FIG. 2 illustrates a schematic view of an auto-injection system configured to insert a fuel additive into an engine or fuel tank for the engine.

Moving on, another embodiment of the system 10 includes a fuel stabilizer injector 26 that automatically injects the solution of fuel additive into the fuel tank 28 during a starting procedure of the machine as shown in FIG. 2. More specifically, the fuel stabilizer injection 26 includes a reservoir 30 in which the solution is stored. The reservoir 30 is connected to fuel tank 28 by a stabilizer line 32 that connects to a dual outlet fitting 34. The dual outlet fitting 34 has a jet 36 formed therein.

Figure 3:
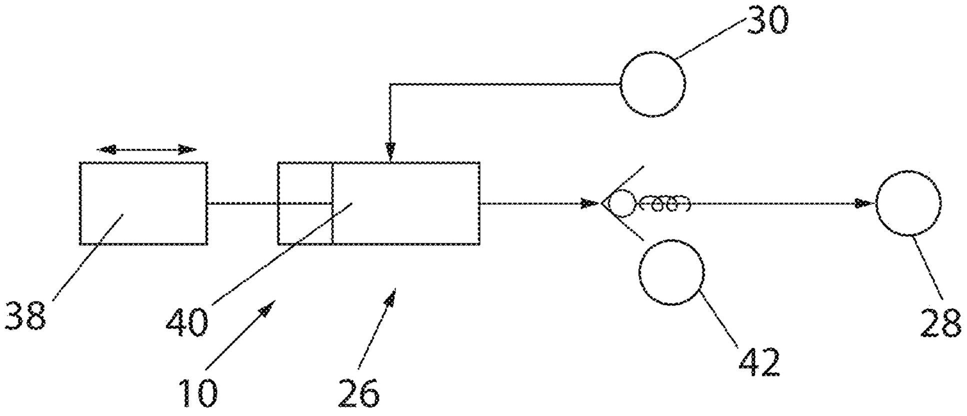
FIG. 3 illustrates another schematic view of an auto-injection system configured to insert a fuel additive into an engine.

The fuel stabilizer injector 26 is further shown in FIG. 3. The injector 26 includes a solenoid 38 or a mechanical link to a choke, as well as a cylinder 40 connected to the reservoir 30. Additionally, the injector 26 includes a line to a fuel tank 28, as well as a one-way check valve 42. When the unit is started, the solenoid 38 activates the injector and the stabilizer solution is automatically injected into the fuel tank 28, which treats the fuel for extended periods of time.

Figure 4:
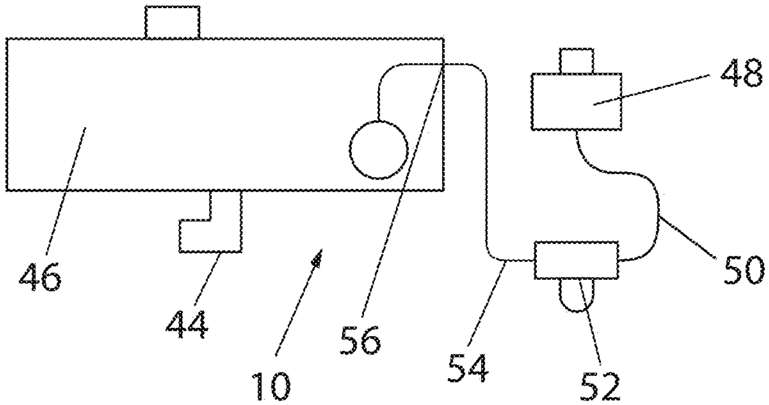
FIG. 4 illustrates a schematic view of a manual injection system configured to insert a fuel additive into an engine.

In an alternative embodiment, the system shown in FIGS. 2 and 3 could be replaced with a manual injection system 44. For instance, as shown in FIG. 4, the system 10 includes a fuel tank 46 and a stabilizer reservoir 48 that is connected to the fuel tank 46 by a number of lines. As shown, a stabilizer line 50 is provided that extends from the reservoir 48 to a wet bulb primer 52, and then another stabilizer line 54 is provided from the primer 52 to the fuel tank 46. Additionally, an orifice 56 may be provided where the line 54 connects to the tank 46. In one embodiment, the primer bulb 52 is similar in operation to a chainsaw, where the primer may be located on a dash plate with instructions for initial priming. The instructions may further clarify the number of primes per tank of fuel to stabilize.

Solid Additive Container

Figure 1B:
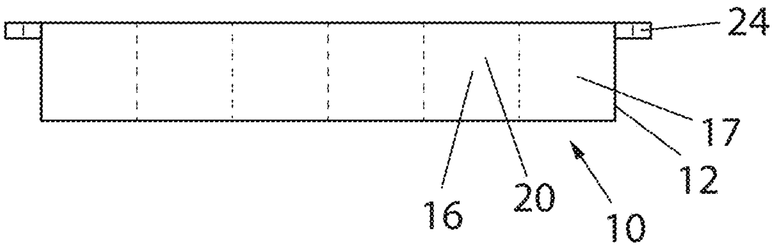

Turning to FIGS. 1A and 1B, another embodiment of the system 10 is shown. More specifically, this system 10 includes a solid or semi-solid fuel stabilizer tablet 12 that can be manually inserted into the fuel tank of the engine. More specifically, one or more tablets 12 may be provided that can be inserted into the fuel tank of the engine. In the illustrated embodiment, a storage container 14 may be provided having one or more, as shown six, separate compartments 16, with each containing one tablet 12. The specific number of compartments 16 may be selected based on specific time intervals of use. For instance, in the illustrated embodiment, the six compartment 16 configuration may be configured to provide six months of protection, with a single tablet 12 being used each month. In other embodiments, the number of compartments 16 and strength of tablets 12 may be based on a number of hours of protection, such as a container equipped for 100 hours of protection. Of course, the container 14 may include additional or fewer compartments 16. Further, the tablets 12 may be configured to provide a longer term of protection, for instance longer than a month, or a shorter term of protection, for instance shorter than a month. Additionally, a label 17 may be provided on the container 14 that provides information regarding to the contents and length of protection, for instance in terms of hours of protection or gallons of protection. The label 17 may additionally provide instructions of use to simplify use of the invention.

In certain embodiments, each tablet 12 may be presented in a sealed pouch 18 because the tablet 12 contains a variety of different materials, chemicals, and other substances that may be harmful when direct contact is made with human skin. In other embodiments, the tablet 12 need not be in a sealed pouch, and instead a user can simply open a door 20 covering the compartments 16 and attached to the container 14 about a hinge 22, after which the storage container 14 is tipped next to the fuel tank so that the tablet 12 drops into the fuel tank without requiring a user to touch the tablet 12 itself. This may occur at a variety of desired intervals, including inserting one tablet 12 every time the tank is filled with gas, or during other intervals when the machine is not in active use. Additionally, the container 14 may include a mount 24 that enables the container 14 to be releasably affixed to the engine or component associated with the engine. The mount 24 may include one or more of a snap fit, a clip, a screw, a bolt, a hook, or any other temporary fastener that would allow the container 14 to be secured to the machine.

According to one aspect of the present invention, the system includes at least one solid or semi solid fuel stabilizer tablet. For instance, the system may include a storage container having a plurality of compartments that are configured to house a plurality of the solid or semi-sold fuel stabilizer tablets. The solid or semi-solid fuel stabilizer tablets may be contained within a sealed pouch. Additionally, the storage container may include lids associated with each of the compartments, with the lids hingedly attached to the container. Further still, the storage container may include one or more mounts that enable the container to be mounted to the fuel tank or associated machinery.

Liquid Additive Container

Figure 5:
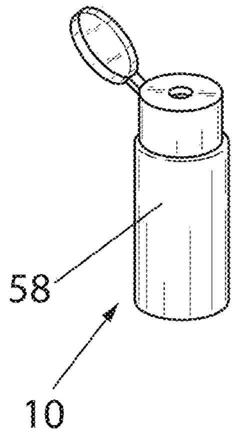
FIG. 5 illustrates a perspective view of a container configured to inject fuel additive into an engine.
Figure 6:
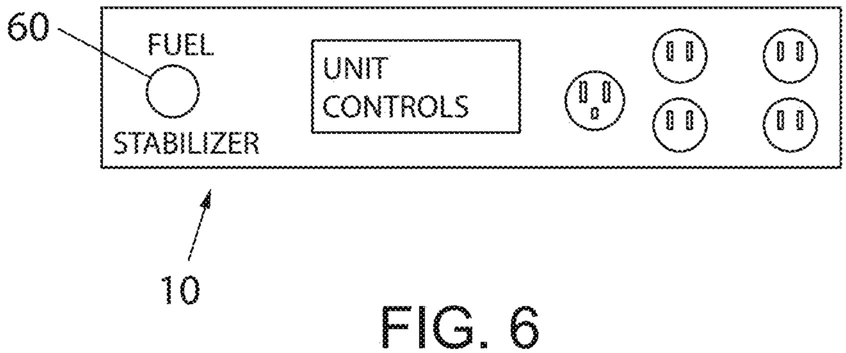
FIG. 6 illustrates a bottle holder on a control panel with instructions for use associated with a fuel additive.

According to yet another embodiment of the present embodiment, the system 10 includes an on board manual fuel stabilizer system 10 that a user could manually use to add a fuel stabilizer liquid to a fuel tank. As shown in FIG. 5, the stabilizer system 10 includes a liquid squeeze bottle 58 that houses a liquid form stabilizer. For instance, in one embodiment, each squeeze of the bottle 58 treats one full tank of fuel. The bottle 58 is squeezed into the fuel tank every time the tank is filled with gas. The solution may come in a variety of different concentrations, for instance, with one drop of liquid being configured to treat one gallon of gas. The bottle 58 may be stored on the unit, for instance, by removably mounting it to a side. Each bottle 58 may be equipped to treat a specific, predetermined number of tanks of fuel. For instance, where the bottle 58 is equipped to treat multiple tanks of fuel, various indicators, such as lines drawn or formed in the side of the bottle that are viewable from the outside of the bottle 58 so a user knows how much to deposit into the fuel tank. Once the contents of a bottle 58 have been depleted, the bottle 58 can be refilled, it can be returned for a replacement bottom, or it can otherwise be disposed of. FIG. 6 also provides a bottle 58 holder 60 with instructions for use.

Mechanical Scrape

According to yet another embodiment, the system may include a pin or slide mechanism that dislodges or otherwise breaks apart varnish or gum deposits within the machine, such as a carburetor of the machine. The pin or slide mechanism may be used to easily access the components of the machine, such as the carburetor and internal components so that fuel path obstructions can be cleared.

All the disclosed embodiments are useful in conjunction with fuel-powered machinery, and preservation of the associated fuel tank and other components, as well as fuel contained therein. There are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

In addition, the individual components need not be fabricated from the disclosed materials, but could be fabricated from virtually any suitable materials. Moreover, the individual components need not be formed in the disclosed shapes, or assembled in the disclosed configuration, but could be provided in virtually any shape, and assembled in virtually any configuration. Further, although the various components are described herein as being physically separate modules, it will be manifest that any of the components may be manufactured together or later assembled with one another. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

We claim:

1. A fuel additive system comprising:
- an engine for a small engine machine;
- a fuel tank connected to the engine and having a size configured for a small engine machine;
- a reservoir in fluid communication with the fuel tank, the reservoir configured to store a fuel additive;
- an injector system configured to transfer the fuel additive from the reservoir to the fuel tank;
- a control system having a timer, wherein the timer measures a time elapsed since the startup of the engine;
- a volume of the fuel additive selected by the control system based at least in part on the size of the fuel tank;
- the control system configured to control the injector system, wherein the injector system transfers the volume of the fuel additive from the reservoir to the fuel tank, the transfer initiated automatically based on the time elapsed since the startup of the engine.

2. The fuel additive system of claim 1, further comprising
- a line to the fuel tank;
- a one-way check e in communication with the line;
- wherein the fuel additive has a composition, and
- the control system is configured to select the volume of the fuel additive based at least in part on the composition of the fuel additive.

3. The fuel additive system of claim 1, wherein the control system measures a time elapsed since the transfer,
- the control system configured to forego initiation of a second transfer when the time elapsed since the transfer is less than a predetermined setpoint.

4. The fuel additive system of claim 1, wherein the control system is configured to modulate the injector system based on
- (a) time elapsed since the transfer,
- (b) time elapsed since the startup of the engine, and
- (c) the volume of the fuel additive.

5. The fuel additive system of claim 1, wherein the reservoir is located on the small engine machine and the reservoir is transparent so as to easily view a level of additive the reservoir.

6. The fuel additive system of claim 1, wherein the control system is configured to initiate a second transfer of fuel additive when the time elapsed is greater than a predetermined setpoint.

7. The fuel additive system of claim 1, wherein the small engine machine is selected from a group consisting of generators, lawn mowers, snow blowers, and pressure washers.

8. The fuel additive system of claim 1, wherein the fuel tank stores a fuel for an extended period of time without use, and the fuel stabilizer is configured to at least partially prevent the fuel from going stale, wherein an extended period of time is more than one month.

9. A method of injecting a fuel additive into a fuel tank comprising:
- providing a reservoir in fluid communication with a fuel tank, the fuel tank connected to an engine for a small engine machine and having a size configured for a small engine machine;
- storing a fuel additive in the reservoir;
- starting the engine;
- selecting a volume of the fuel based at least in part on the size of the fuel tank;
- measuring a time elapsed since starting the engine; and
- automatically transferring the volume of the fuel additive from the reservoir to the fuel tank based on the time elapsed since starting the engine.

10. The method of claim 9, wherein the fuel additive has a composition, the method further comprising selecting the volume of the fuel additive based at least in part on the composition of the fuel additive.

11. The method of claim 9, further comprising measuring a time elapsed since transferring the volume of fuel additive;

initiating a second transfer of fuel additive when the time elapsed since transferring the volume of fuel additive is greater than a predetermined setpoint.

12. The method of claim 9, further comprising providing an injector system that comprises a pump, the injector system in fluid communication with the reservoir and the fuel tank; and pumping the volume of the fuel additive from the reservoir to the fuel tank.

13. The method of claim 9, further comprising storing a fuel in the fuel tank for an extended period of time without use, wherein an extended period of time is more than one month; and at least partially preventing the fuel from going stale by transferring the fuel additive to the fuel tank.

14. A small engine machine comprising:

an engine;

a fuel tank connected to the engine and having a size to hold between 0.5 and 9 gallons of fuel;

a reservoir located on the machine, the reservoir in fluid communication with the fuel tank;

a fuel additive stored within the reservoir;

an injector system configured to transfer the fuel additive from the reservoir to the fuel tank;

a control system having a timer, wherein the timer measures a time elapsed since the startup of the engine;

a volume of the fuel additive selected by the control system based at least in part on the size of the fuel tank;

the control system configured to control the inject system, wherein the injector system transfers the volume of the fuel additive from the reservoir to the fuel tank, the transfer initiated automatically based on the time elapsed since the start-up of the engine.

15. The machine of claim 14, wherein the fuel additive has a composition, and the control system is configured to select the volume of the fuel additive based at least in part on the composition of the fuel additive.

16. The machine of claim 14, wherein the engine has an engine displacement from 50 cc to 1,000 cc.

17. The machine of claim 14, wherein the machine is a generator.

18. The machine of claim 14, wherein the injector system comprises a pump.

19. The machine of claim 14, further comprising conduit connecting the reservoir to the injector system and the injector system to the fuel tank such that the reservoir, the injector system, and the fuel tank are in fluid communication.

20. The machine of claim 14, wherein the fuel additive is a fuel stabilizer.

* * * * *